(12) United States Patent
Yatagai et al.

(10) Patent No.: US 7,851,531 B2
(45) Date of Patent: Dec. 14, 2010

(54) AQUEOUS PRESSURE-SENSITIVE ADHESIVE COMPOSITION, PRESSURE-SENSITIVE ADHESIVE TAPE AND WIRE HARNESS

(75) Inventors: Takahiro Yatagai, Ibaraki (JP); Masato Shirai, Ibaraki (JP); Masanori Myoujin, Ibaraki (JP)

(73) Assignee: Nitto Denko Corporation, Osaka (JP)

(*) Notice: Subject to any disclaimer, the term of this patent is extended or adjusted under 35 U.S.C. 154(b) by 365 days.

(21) Appl. No.: 11/652,340

(22) Filed: Jan. 11, 2007

(65) Prior Publication Data
US 2007/0167546 A1 Jul. 19, 2007

(30) Foreign Application Priority Data
Jan. 13, 2006 (JP) .............................. 2006-005758
Oct. 18, 2006 (JP) .............................. 2006-283921

(51) Int. Cl.
*C09D 11/02* (2006.01)
(52) U.S. Cl. .................. 524/270; 524/501; 524/187; 428/343; 156/334
(58) Field of Classification Search .................. 524/270
See application file for complete search history.

(56) References Cited

U.S. PATENT DOCUMENTS

| 5,116,895 | A |   | 5/1992 | Knutson |   |
|---|---|---|---|---|---|
| 5,236,624 | A | * | 8/1993 | Lepert et al. | 523/353 |
| 5,606,016 | A | * | 2/1997 | Maeda et al. | 530/210 |
| 6,586,505 | B1 | * | 7/2003 | Cronin et al. | 524/18 |
| 2001/0031355 | A1 | * | 10/2001 | Nakagawa et al. | 428/355 AC |
| 2001/0052557 | A1 | * | 12/2001 | Rouse et al. | 241/21 |
| 2003/0158331 | A1 | * | 8/2003 | Shoaf et al. | 524/821 |
| 2004/0254276 | A1 | * | 12/2004 | Okada et al. | 524/272 |

FOREIGN PATENT DOCUMENTS

| EP | 0 626 398 |   | 11/1994 |
|---|---|---|---|
| JP | 3-170574 |   | 7/1991 |
| JP | 07-133473 | * | 5/1993 |
| JP | 7-133473 A |   | 5/1995 |
| JP | 2004115767 | * | 4/2004 |
| JP | 2005029759 | * | 2/2005 |

OTHER PUBLICATIONS

Zile and Borglin, Use of Modified Rosins in Soap, Oil and Soap, Dec. 1945, p. 331-334.*
European Search Report issued on the corresponding European Patent Application No. 06026621.0, dated May 6, 2008.

* cited by examiner

*Primary Examiner*—Vasu Jagannathan
*Assistant Examiner*—Doris L Lee
(74) *Attorney, Agent, or Firm*—Knobbe Martens Olson & Bear LLP

(57) ABSTRACT

An aqueous pressure-sensitive adhesive composition of the invention comprises a rubber-based latex and a tackifier resin emulsion, wherein the tackifier resin emulsion is that obtained by emulsifying a tackifier resin in the presence of an emulsifier containing an ammonium salt of rosins; and the aqueous pressure-sensitive adhesive composition contains a water-soluble salt of casein as protective colloid. The aqueous pressure-sensitive adhesive composition is excellent in mechanical stability and insulating characteristics and has good moisture-proof adhesive strength.

20 Claims, No Drawings

AQUEOUS PRESSURE-SENSITIVE ADHESIVE COMPOSITION, PRESSURE-SENSITIVE ADHESIVE TAPE AND WIRE HARNESS

This application claims priority to Japanese Patent Application No. JP2006-005758, filed Jan. 13, 2006 and Japanese Patent Application No. JP2006-283921, filed Oct. 18, 2006. The above-referenced applications are hereby expressly incorporated by references in their entireties.

BACKGROUND OF THE INVENTION

1. Field of the Invention

The present invention relates to a rubber-based aqueous pressure-sensitive adhesive composition and a pressure-sensitive adhesive tape employing the aqueous pressure-sensitive adhesive composition. The pressure-sensitive adhesive tape of the present invention can be applied to various kinds of uses to which a pressure-sensitive adhesive tape comprising a rubber-based pressure-sensitive adhesive layer as a pressure-sensitive adhesive layer has conventionally been applied. The pressure-sensitive adhesive tape of the present invention is useful as a pressure-sensitive adhesive tape for electrical insulation. And the pressure-sensitive adhesive tape is available, for example, a pressure-sensitive adhesive tape for protecting or binding a wire harness of automobiles, a pressure-sensitive adhesive tape for insulation used for layer insulation and exterior insulation of electrical parts and electronic parts such as transformers and coils, a pressure-sensitive adhesive tape for display and a pressure-sensitive adhesive tape for identifying. In particular, the pressure-sensitive adhesive tape is useful as a pressure-sensitive adhesive tape for protecting or binding a wire harness of automobiles. In addition to the above, the pressure-sensitive adhesive tape of the present invention can be applied to pressure-sensitive adhesive tapes for various kinds of uses such as a pressure-sensitive adhesive tape for corrugated fibreboard packaging, a pressure-sensitive adhesive tape for medical treatment and a pressure-sensitive adhesive tape for masking. The pressure-sensitive adhesive tape of the present invention is used in a tape or sheet shape.

2. Description of the Related Art

Rubber-based pressure-sensitive adhesives have conventionally been used as pressure-sensitive adhesives. A blend of a tackifier into a base resin has generally been used for these pressure-sensitive adhesives. A solvent type has been in the mainstream as these pressure-sensitive adhesives; however, in view of social request and tightened regulation for environmental protection, resource saving, and safety and health, desolventization is an important problem and a substitute for solvent type pressure-sensitive adhesives has been demanded. Aqueous pressure-sensitive adhesives using rubber-based latex have been used in various kinds of uses as pressure-sensitive adhesives substituting for the above-mentioned solvent type pressure-sensitive adhesives in view of versatility and possibility of the development of applications.

Such rubber-based aqueous pressure-sensitive adhesives are aqueous emulsion, so that stability of the emulsion, particularly, stability for mechanical shear is emphasized for one of performance requirements. Such mechanical stability is stability for mechanical shear applied in gear pumps and roll coaters, and additionally stability for mechanical shear applied during spray coating increased in a coating system in recent years. The case where such mechanical stability becomes poor causes agglomerate in the emulsion to deteriorate commercial value. It has been proposed for mechanical stability of such aqueous pressure-sensitive adhesives that a tackifier resin emulsion obtained by emulsifying a tackifier resin in the presence of an emulsifier and a protective colloid be used as the tackifier for rubber-based latex (Japanese Unexamined Patent Publication No. 7-133473). However, according to the patent, mechanical stability can be improved to some degree and yet is not sufficiently satisfactory.

With regard to rubber-based aqueous pressure-sensitive adhesives, required performance becomes equal to solvent type pressure-sensitive adhesives and is of a higher order with expansion of uses thereof. For example, in the case where rubber-based aqueous pressure-sensitive adhesives are applied to a pressure-sensitive adhesive layer of a pressure-sensitive adhesive tape for electrical insulation, electrical insulation properties are required; however, rubber-based aqueous pressure-sensitive adhesives are insufficient in insulating characteristics by reason of containing a water-soluble ionic emulsifier in very large quantities. Rubber-based aqueous pressure-sensitive adhesives are not sufficient also in moisture-proof adhesive strength under humidification.

SUMMARY OF THE INVENTION

The object of the present invention is to provide an aqueous pressure-sensitive adhesive composition comprising a rubber-based latex and a tackifier resin emulsion, in which mechanical stability is excellent, and insulating characteristics and moisture-proof adhesive strength are good.

Also, the object of the present invention is to provide a pressure-sensitive adhesive tape comprising a pressure-sensitive adhesive layer formed by the above-mentioned aqueous pressure-sensitive adhesive composition, and further to provide a protected or bound wire harness by the pressure-sensitive adhesive tape.

Through earnest studies for solving the above-mentioned problem, the inventors of the present invention have completed the present invention by finding out that the following aqueous pressure-sensitive adhesive composition allows the above-mentioned object to be achieved.

The present invention related to an aqueous pressure-sensitive adhesive composition: comprising a rubber-based latex and a tackifier resin emulsion, wherein the tackifier resin emulsion is that obtained by emulsifying a tackifier resin in the presence of an emulsifier containing an ammonium salt of rosins; and the aqueous pressure-sensitive adhesive composition contains a water-soluble salt of casein as protective colloid.

In the aqueous pressure-sensitive adhesive composition, the rubber-based latex preferably contains a natural rubber latex and a styrene-butadiene copolymer latex.

In the aqueous pressure-sensitive adhesive composition, a proportion in weight ratio of the natural rubber latex and the styrene-butadiene copolymer latex is preferable that the former:the latter=10:90 to 90:10 in terms of a non-volatile component.

In the aqueous pressure-sensitive adhesive composition, the suitable natural rubber latex is a mixture of an unmodified natural rubber latex and an acrylic modified natural rubber latex.

In the aqueous pressure-sensitive adhesive composition, the tackifier resin emulsion preferably contains 1 to 20 parts by weight of the ammonium salt of rosins with respect to 100 parts by weight of the tackifier resin in terms of a non-volatile component.

In the aqueous pressure-sensitive adhesive composition, the tackifier resin preferably contains an aliphatic petroleum resin and an alkylphenol resin.

In the aqueous pressure-sensitive adhesive composition, the ammonium salt of rosins is preferably an ammonium salt of rosins containing dihydroabietic acid by at least 50% by weight or more.

In the aqueous pressure-sensitive adhesive composition, the tackifier resin emulsion is preferable that obtained by emulsifying the tackifier resin in the presence of the emulsifier containing the ammonium salt of rosins and the protective colloid containing the water-soluble salt of casein.

The aqueous pressure-sensitive adhesive composition preferably comprises 1 to 10 parts by weight of the water-soluble salt of casein with respect to 100 parts by weight of the tackifier resin in terms of a non-volatile component.

The aqueous pressure-sensitive adhesive composition preferably comprises 40 to 150 parts by weight of the tackifier resin emulsion with respect to 100 parts by weight of the rubber-based latex in terms of a non-volatile component.

The present invention also related to a pressure-sensitive adhesive tape comprising a pressure-sensitive adhesive layer on at least one side of a substrate, wherein the pressure-sensitive adhesive layer is formed by the above aqueous pressure-sensitive adhesive composition.

In the pressure-sensitive adhesive tape, the substrate is preferably a polyvinyl chloride film.

The above pressure-sensitive adhesive tape is suitable for a pressure-sensitive adhesive tape for protecting or binding a wire harness.

The present invention also related to a protected or bound wire harness, wherein a wire harness is protected or bound by the above pressure-sensitive adhesive tape.

A rubber-based aqueous pressure-sensitive adhesive composition of the present invention contains a protective colloid in addition to a tackifier resin emulsion, and is excellent in mechanical stability. In particular, mechanical stability is excellent in the case where the tackifier resin emulsion is that obtained by emulsifying a tackifier resin in the presence of an emulsifier and a protective colloid. Further, an ammonium salt of rosins is selected as the emulsifier used for the tackifier resin emulsion, and a water-soluble salt of casein is selected as the protective colloid; such selection and combination of the emulsifier and protective colloid allows more improved mechanical stability.

A rubber-based aqueous pressure-sensitive adhesive composition of the present invention is good in insulating characteristics and moisture-proof adhesive strength despite an aqueous pressure-sensitive adhesive composition. The reason why insulating characteristics and moisture-proof adhesive strength are improved is not certain; however, it is surmised that insulating characteristics and moisture-proof adhesive strength are improved for the reason that an ammonium salt of rosins used as the emulsifier has no water-solubility as the emulsifier when the ammonium salt is volatilized at the drying step in forming a pressure-sensitive adhesive layer, the remaining rosins can function also as a tackifier resin, and additionally a combination of the ammonium salt of rosins and a water-soluble salt of casein as the protective colloid acts.

Thus, a pressure-sensitive adhesive tape using a rubber-based aqueous pressure-sensitive adhesive composition of the present invention is so favorable in insulating characteristics and moisture-proof adhesive strength as to be appropriately used as a pressure-sensitive adhesive tape for insulation, particularly, a pressure-sensitive adhesive tape for protecting or binding a wire harness of automobiles.

DETAILED DESCRIPTION OF THE PREFERRED EXAMPLES

An aqueous pressure-sensitive adhesive composition of the present invention comprises a rubber-based latex and a tackifier resin emulsion.

Examples of rubber-based latex include natural rubber latex, styrene-butadiene copolymer latex and chloroprene latex. Rubber-based latex used for an aqueous pressure-sensitive adhesive composition can be used for natural rubber latex with no particular limitation, and may be subject to either of depolymerization or not. Modified natural rubber latex through acrylic modification in addition to unmodified natural rubber latex can be used as natural rubber latex. A mixture of unmodified natural rubber latex and modified natural rubber latex through acrylic modification can be used as natural rubber latex. Commercial products can typically be used for styrene-butadiene copolymer latex and chloroprene latex with no particular limitation. Styrene-butadiene copolymer latex and chloroprene latex may be carboxy modified.

Rubber-based latex preferably contains natural rubber latex and styrene-butadiene copolymer latex in view of performing favorable adhesive property in the case of being used for a tape for electrical insulation. The proportion in weight ratio of natural rubber latex and styrene-butadiene copolymer latex is preferably that the former:the latter=10:90 to 90:10, more preferably the former:the latter=20:80 to 80:20, further more preferably the former:the latter=30:70 to 70:30 in terms of a non-volatile component.

Natural rubber latex can contain not merely unmodified natural rubber latex but also acrylic modified natural rubber latex in view of increasing unwinding force to render binding workability favorable in a pressure-sensitive adhesive tape made of a polyvinyl chloride film as a substrate, preferably containing a mixture of unmodified natural rubber latex and acrylic modified natural rubber latex. The proportion in weight ratio of unmodified natural rubber latex and acrylic modified natural rubber latex is preferably that the former:the latter=0:100 to 100:0, more preferably the former:the latter=20:80 to 80:20, further more preferably the former:the latter=40:60 to 60:40 in terms of a non-volatile component.

Tackifier resin emulsion is obtained by emulsifying a tackifier resin in the presence of an emulsifier and a protective colloid.

Various kinds of publicly known tackifier resin can be used with no particular limitation. Examples thereof include rosins, rosin derivatives, petroleum resins, terpene resins and alkylphenol resins, one kind of which can be used singly or two kinds or more thereof can be used by mixture.

Examples of rosins include raw material rosin such as gum rosin, wood rosin or tall oil rosin, or stabilized rosin and polymerized rosin such that the above-mentioned raw material rosin is disproportionated or hydrotreated. Examples of rosin derivatives include rosin esters and rosin phenols. Examples of rosin esters include rosin ester obtained by subjecting the above-mentioned rosins to esterification reaction with polyhydric alcohol, polyhydric alcohol ester of partially maleinized or partially fumarized rosin obtained by partially fumarizing or maleinizing the raw material rosin and subsequently esterifying, and polyhydric alcohol ester of partially maleinized or partially fumarized disproportionated rosin obtained by partially fumarizing or maleinizing the raw material rosin, thereafter disproportionating and subsequently esterifying. Rosin phenols signify such that phenols are added to rosins and thermally polymerized, or subsequently esterified. The above-mentioned polyhydric alcohol used for esterification is not particularly limited, examples of which include various kinds of publicly known diethylene glycol, glycerin, trimethylolpropane, trimethylolethane, 1,2,6-hexanetriol, 1,2,4-butanetriol and pentaerythritol.

Examples of petroleum resin include aliphatic petroleum resin, aromatic petroleum resin, aliphatic/aromatic mixed resin, pure monomer resin, dicyclopentadiene petroleum resin and hydrides thereof.

Aliphatic petroleum resin is such that C5 fraction among cracked fractions of petroleum naphtha is principally refined and subjected to cationic polymerization, examples of which include homopolymers comprising cis-piperylene, trans-piperylene, isoprene, 2-methylbutene 2 and dicyclopentadiene as a principal component monomer, copolymers thereof, and hydrogenated products thereof. Aromatic petroleum resin is such that C9 fraction among cracked fractions of petroleum naphtha is principally refined and subjected to cationic polymerization, examples of which include homopolymers comprising styrene, indene, methylindene, methyl styrene and coumarone (benzo[b]furan) as a principal component monomer, copolymers thereof, and hydrogenated products thereof. Aliphatic/aromatic mixed resin is such that a blend of C5 fraction and C9 fraction among cracked fractions of petroleum naphtha is principally subjected to cationic polymerization, examples of which include copolymers of dicyclopentadiene, dimethyldicyclopentadiene and diene monomer (C5 fraction dimer) with styrene and indene, and hydrogenated products thereof.

Examples of terpene resin include homopolymers such as α-pinene, β-pinene, limonene and dipentene, or copolymers and terpene phenol copolymers thereof, and hydrogenated products thereof, further including aromatic modified terpene resin such that terpene and an aromatic monomer such as styrene are copolymerized. These may be used by mixture.

Alkylphenol resin is resin (oily phenol resin) obtained from alkylphenol and formaldehyde, examples of which include a novolac type and resole type.

The above-mentioned tackifier resin can be used through proper selection in accordance with various kinds of uses in consideration of properties such as softening point, and in the case of using an aqueous pressure-sensitive adhesive composition for a pressure-sensitive adhesive tape for protecting or binding a wire harness, aliphatic petroleum resin and alkylphenol resin are preferably used as the tackifier resin in view of an improvement in property balance between adhesive property and cohesive force. In this case, the proportion of aliphatic petroleum resin and alkylphenol resin is preferably the former:the latter=95:5 to 50:50, more preferably the former:the latter=95:5 to 70:30.

An emulsifier used for a tackifier resin emulsion is an ammonium salt of rosins. Even though a salt of rosins, alkali metal salts such as a potassium salt and sodium salt except an ammonium salt are not sufficient in any of mechanical stability, insulating characteristics and moisture-proof adhesive strength. Similarly to the above, examples of rosins include raw material rosin such as gum rosin, wood rosin or tail oil rosin, or stabilized rosin and polymerized rosin such that the above-mentioned raw material rosin is disproportionated or hydrotreated. One kind of these rosins can be used singly, or two kinds or more thereof can be used together.

With regard to the above-mentioned ammonium salt of rosins, in the case of using an aqueous pressure-sensitive adhesive composition for a pressure-sensitive adhesive tape for protecting or binding a wire harness, the ammonium salt of rosins containing dihydroabietic acid by at least 50% by weight, further by at least 60% by weight is preferably used in view of easiness to emulsify and standing stability of emulsion. The rosins are obtained by stabilized rosin such as to be disproportionated or hydrotreated. In particular, hydrotreated, so-called hydrogenated rosin is appropriate. The ammonium salt of rosins such as this hydrogenated rosin containing dihydroabietic acid by at least 50% by weight can be used by mixture with an ammonium salt of polymerized rosin. For example, in the case of a vinyl chloride pressure-sensitive adhesive tape such that a polyvinyl chloride adhesive film is used for a substrate, the mixture with an ammonium salt of polymerized rosin allows the effect of improving adhesive property of the pressure-sensitive adhesive tape, specifically, end peelability of the pressure-sensitive adhesive tape. In this case, the proportion of ammonium salt of hydrogenated rosin:ammonium salt of polymerized rosin is preferably the former:the latter=60:40 to 95:5, more preferably the former:the latter=60:40 to 90:10 so that the ammonium salt of rosins contains an ammonium salt of dihydroabietic acid by at least 50% by weight.

The used amount of an ammonium salt of rosins as an emulsifier is not particularly limited and yet is preferably approximately 1 to 20 parts by weight, more preferably 3 to 15 parts by weight, further more preferably 5 to 12 parts by weight with respect to 100 parts by weight of tackifier resin in terms of a non-volatile component. The case of more than 20 parts by weight deteriorates the obtained tackiness at low temperature, while the case of less than 1 part by weight deteriorates stability of the resin emulsion in emulsifying.

Protective colloid used for an aqueous pressure-sensitive adhesive composition of the present invention is a water-soluble salt of casein. The water-soluble salt of casein signifies such as to be obtained by solubilizing casein as native phosphoprotein made of milk, soybean and the like in an aqueous solution of basic substances such as sodium hydroxide, potassium hydroxide, ammonia and organic amines. An ammonium aqueous solution is appropriately used as the water-soluble salt of casein.

It is preferred that the water-soluble salt of casein used as protective colloid is contained in an aqueous pressure-sensitive adhesive composition. For example, an aqueous pressure-sensitive adhesive composition may be prepared by adding the water-soluble salt of casein when preparing an aqueous pressure-sensitive adhesive composition by the blending of rubber-based latex and tackifier resin emulsion, or after the above-mentioned blending. The water-soluble salt of casein may be contained in an aqueous pressure-sensitive adhesive composition in such a manner that the water-soluble salt of casein is used together with an emulsifier and contained in tackifier resin emulsion when emulsifying tackifier resin by the emulsifier. In the present invention, the water-soluble salt of casein used as protective colloid is preferably used together with an emulsifier when emulsifying tackifier resin by the emulsifier.

The used amount of a water-soluble salt of casein as protective colloid is not particularly limited and yet is preferably approximately 1 to 10 parts by weight, more preferably 2 to 8 parts by weight with respect to 100 parts by weight of tackifier resin in terms of a non-volatile component. The case of more than 10 parts by weight increases viscosity of the tackifier resin emulsion obtained by emulsifying to render the handling difficult, while the case of less than 1 part by weight dose not allow mechanical stability of an aqueous pressure-sensitive adhesive composition to be sufficiently improved, which comprises the tackifier resin emulsion obtained by emulsifying contained.

The production of the tackifier resin emulsion can adopt the same method as conventionally known emulsion methods except for using an ammonium salt of rosins as an emulsifier. On the occasion of the production of the tackifier resin emulsion, emulsification can be performed in the presence of the above-mentioned emulsifier as well as the water-soluble salt of casein used as protective colloid.

Examples of emulsion methods include general high pressure emulsion method and inverse emulsion method; specifically including a method such that the above-mentioned tackifier resin is dissolved in solvents such as benzene and toluene, and thereafter the above-mentioned emulsifier, as required protective colloid and soft water, are added thereto and made into emulsion by using a high pressure emulsifier to thereafter remove the solvents under reduced pressure; a method such that a small amount of solvents such as benzene and toluene are mixed into the tackifier resin, and subsequently the emulsifier, as required protective colloid, are incorporated thereinto, and further hot water is gradually added thereto and subjected to phase reversal of emulsification to obtain emulsion and thereafter remove under reduced pressure or use directly the solvents; and a method such that the resin is heated-up to the softening point thereof or more in an autoclave, and the emulsifier, as required protective colloid, are incorporated thereinto, and then hot water is gradually added thereto, subjected to phase reversal of emulsification and made into emulsion.

On the occasion of the above-mentioned emulsification, the following can be used if within a range of not impairing the object of the present invention: anionic emulsifying agents such as α-olefin sulfonated products, alkyl sulfate, alkylphenyl sulfate, polyoxyethylene alkylphenyl ether sulfate and sulfosuccinate half ester salt of polyoxyethylene aralkylphenyl ether, nonionic emulsifying agents such as polyoxyethylene alkylphenyl ether, and protective colloid such as gelatin, polyacrylic acid, polyvinyl alcohol, polyvinyl alcohol derivatives, water-soluble salt of cellulose and cellulose derivatives.

The proportion of the rubber-based latex and the tackifier resin emulsion in an aqueous pressure-sensitive adhesive composition of the present invention is properly determined in accordance with uses and is preferably determined as 40 to 150 parts by weight of the tackifier resin emulsion with respect to 100 parts by weight of the rubber-based latex typically in terms of a non-volatile component. The case where the tackifier resin emulsion is less than 40 parts by weight brings a tendency to decrease adhesive strength, while the case where the tackifier resin emulsion is more than 150 parts by weight brings a tendency to decrease cohesive force; neither of the cases is appropriate.

On the occasion of the production of the tackifier resin emulsion, in the case of not using a water-soluble salt of casein as protective colloid, the water-soluble salt of casein is added when or after blending the rubber-based latex and the tackifier resin emulsion to prepare an aqueous pressure-sensitive adhesive composition of the present invention. Also, on the occasion of the production of the tackifier resin emulsion, in the case of using a water-soluble salt of casein as protective colloid, the water-soluble salt of casein can be post-added when preparing an aqueous pressure-sensitive adhesive composition. Even in such a case, similarly to the above, the proportion of the rubber-based latex and the tackifier resin emulsion is preferably determined as 40 to 150 parts by weight of tackifier resin emulsion with respect to 100 parts by weight of rubber-based latex. Also, similarly to the above, the blended amount of the water-soluble salt of casein post-added (the total amount in the case where the water-soluble salt of casein is contained in the tackifier resin emulsion) is preferably approximately 1 to 10 parts by weight, more preferably 2 to 8 parts by weight with respect to 100 parts by weight of the tackifier resin.

With regard to an aqueous pressure-sensitive adhesive composition of the present invention, various kinds of addition agents also can properly be used in a range of not deviating from the object of the present invention, such as an antifoaming agent, thickener, filler, pigment, coloring agent, antioxidant, ultraviolet absorbing agent, water resistant additive and film formation assistant.

A pressure-sensitive adhesive tape of the present invention comprises a pressure-sensitive adhesive layer formed by the above-mentioned aqueous pressure-sensitive adhesive composition on at least one plane of a substrate. The pressure-sensitive adhesive layer may be provided through an under coat.

Various kinds of materials can be used as a substrate through proper selection in accordance with various kinds of uses. Examples thereof include polyolefin such as low-density polyethylene, straight-chain polyethylene, medium-density polyethylene, high-density polyethylene, ultra-low density polyethylene, random copolypropylene, block copolypropylene, homopolypropylene, polybutene and polymethylpentene; ethylene-vinyl acetate copolymer; ionomer resin; ethylene-(meth)acrylic acid copolymer; ethylene-(meth)acrylate (random, alternating) copolymer; ethylene-butene copolymer, ethylene-hexene copolymer; polyurethane; polyester such as polyethylene terephthalate and polyethylene naphthalate; polycarbonate; polyimide; polyether ether ketone; polyimide; polyphenylsulfide; aramid (paper); glass; glass cloth; fluororesin; polyvinyl chloride; polyvinylidene chloride; cellulosic resin; silicone resin; metal (foil), and paper. A thickness of the substrate is typically approximately 20 to 200 μm.

For example, in the case of being used for a pressure-sensitive adhesive tape for protecting or binding a wire harness, the substrate is appropriately a polyvinyl chloride film.

A pressure-sensitive adhesive layer can be formed by applying and drying the above-mentioned aqueous pressure-sensitive adhesive composition directly to a substrate or on an under coat surface. Transferring a pressure-sensitive adhesive layer formed on a separator can also form a pressure-sensitive adhesive layer. The thickness of the pressure-sensitive adhesive layer (after drying) is typically approximately 5 to 100 μm, preferably 10 to 70 μm.

EXAMPLES

The present invention is hereinafter described more specifically by examples and yet is not limited thereto. 'Part' signifies part by weight (in terms of a non-volatile component) hereinafter.

Example 1

Rubber-Based Latex 20 parts of natural rubber latex (trade name: HYTEX, handled by Nomura Trading Co., Ltd.), 20 parts of acrylic modified natural rubber latex and 60 parts of styrene-butadiene copolymer latex (trade name: 2108, manufactured by JSR Corporation) were mixed to prepare rubber-based latex. The acrylic modified natural rubber latex adopted a reactant in such a manner that 100 parts of natural rubber latex (trade name: HYTEX, handled by Nomura Trading Co., Ltd.) and 1 part of an emulsifier (trade name: NOPCO 38C, manufactured by SAN NOPCO LIMITED) were subjected to mixed reaction at a temperature of 30° C. under a nitrogen stream for 2 hours, and thereafter a mixture of 10 parts of methyl methacrylate and 1 part of cumene hydroperoxide was added thereto and mixed while stirred for 1 hour, and further 0.4 part of tetraethylenepentamine was added thereto and mixed while stirred for 4 hours.

(Tackifier Resin Emulsion)

80 parts of aliphatic petroleum resin (trade name: ESCOLETS 1304, manufactured by Toneks Co., Ltd.) and 20 parts of alkylphenol resin (trade name: TACKROL 201, manufactured by Taoka Chemical Co., Ltd.) were used as tackifier resin and dissolved in 40 parts of toluene to prepare resin solution. Separately, 4 parts of casein, 15 parts of 28%-ammonia water with respect to 100 parts by weight of casein and 60 parts of water were dissolved by heating at a temperature of 70° C. to prepare ammonia aqueous solution of casein. This was used as protective colloid. After cooling the above-mentioned ammonia aqueous solution of casein to a temperature of 40° C., 8 parts of an ammonium salt of hydrogenated rosin (the proportion of dihydroabietic acid is 60% by weight) were mixed thereinto as an emulsifier, and thereafter the above-mentioned resin solution was stirred therewith by using T.K. HOMO DISPER manufactured by PRIMIX Corporation at the number of revolutions of 800 rpm for 1 hour to prepare tackifier resin emulsion. The temperature of emulsifier solution in emulsifying and the resin solution was adjusted to 40° C.

(Aqueous Pressure-Sensitive Adhesive Composition)

An aqueous pressure-sensitive adhesive composition was obtained by mixing 100 parts by weight of the above-mentioned rubber-based latex and 100 parts by weight of the above-mentioned tackifier resin emulsion.

(Pressure-Sensitive Adhesive Tape)

The aqueous pressure-sensitive adhesive composition obtained in the above was uniformly applied and dried to a polyvinyl chloride film having a thickness of 80 μm so that dry film thickness thereof became 20 μm to produce a pressure-sensitive adhesive tape.

Examples 2 to 8 and Comparative Examples 1 to 5

Tackifier Resin Emulsion

Tackifier resin emulsions were prepared in the same manner as Example 1 except for modifying kinds or used amounts of rubber-based latex as shown in Table 1 on the occasion of preparing rubber-based latex, and modifying kinds or used amounts of emulsifiers and used amounts of protective colloid as shown in Table 1 on the occasion of preparing tackifier resin emulsion.

(Aqueous Pressure-Sensitive Adhesive Composition)

Aqueous pressure-sensitive adhesive compositions were obtained in the same manner as Example 1 except for modifying tackifier resin emulsions into preparations in each of the Examples.

(Pressure-Sensitive Adhesive Tape)

Pressure-sensitive adhesive tapes were produced in the same manner as Example 1 except for modifying aqueous pressure-sensitive adhesive compositions into preparations in each of the Examples.

(Evaluation)

The following evaluations were performed for the aqueous pressure-sensitive adhesive compositions and pressure-sensitive adhesive tapes obtained in each of the Examples to show results thereof in Table 1.

(Mechanical Stability)

The aqueous pressure-sensitive adhesive composition was adjusted to a non-volatile component of 40% by weight to thereafter calculate incidence rate of agglomerate by a Maron mechanical stability tester.

Incidence rate of agglomerate(%)=(agglomerate/initial solid content)×100

The conditions of a Maron mechanical stability tester were load: 10 kg, number of revolutions: 1000 rpm and share time: 10 minutes.

An incidence rate of agglomerate of 1.0% or more causes agglomerate in transportation by a gear pump to render the transportation difficult.

(Moisture-Proof Adhesive Strength)

The pressure-sensitive adhesive tape was projected under the humidified condition of 60° C.×90% R.H. for 10 days and thereafter cooled at a temperature of 23° C. for 1 hour. Thereafter, adhesive strength of the pressure-sensitive adhesive tape to the back face thereof (adhesive strength after humidifying) was measured. Moisture-proof adhesive strength was denoted by rate of change of the adhesive strength after humidifying to initial adhesive strength before projecting the pressure-sensitive adhesive tape under the humidified condition, shown in the following. The measurement of adhesive strength conformed to JIS Z0237.

Moisture-proof adhesive strength(%)=(adhesive strength after humidifying/initial adhesive strength)×100

A moisture-proof adhesive strength of 85% or less brings low reliability to cause peeling and lifting after binding.

(Insulating Characteristics)

The pressure-sensitive adhesive tape was projected under the humidified condition of 60° C.×90% R.H. for 10 days and thereafter cooled at a temperature of 23° C. for 1 hour. Thereafter, volume resistivity of the pressure-sensitive adhesive tape (volume resistivity after humidifying) was measured. Insulating characteristics were denoted by rate of change of the volume resistivity after humidifying to initial volume resistivity before projecting the pressure-sensitive adhesive tape under the humidified condition, shown in the following. The measurement of volume resistivity conformed to JIS C2107.

Insulating characteristics(%)=(volume resistivity after humidifying/initial volume resistivity)×100

Insulating characteristics of 85% or less cannot be accepted as electrical insulation properties.

(End Peeling)

End peeling was evaluated in conformance with ASTM D1000.

TABLE 1

|  |  | Examples | | | | | | | | Comparative Examples | | | | |
| --- | --- | --- | --- | --- | --- | --- | --- | --- | --- | --- | --- | --- | --- | --- |
|  |  | 1 | 2 | 3 | 4 | 5 | 6 | 7 | 8 | 1 | 2 | 3 | 4 | 5 |
| Rubber-based latex (part by weight) | Natural rubber latex | 20 | 20 | 20 | 20 | 40 | 10 | 15 | 25 | 20 | 20 | 20 | 20 | 20 |
|  | Acrylic modified natural rubber latex | 20 | 20 | 20 | 20 | — | 30 | 15 | 25 | 20 | 20 | 20 | 20 | 20 |
|  | Styrene-butadiene copolymer latex | 60 | 60 | 60 | 60 | 60 | 60 | 70 | 50 | 60 | 60 | 60 | 60 | 60 |
| Tackifier resin emulsion | Blended amount of tackifier resin (part by weight) | 100 | 100 | 100 | 100 | 100 | 100 | 100 | 100 | 100 | 100 | 100 | 100 | 100 |
|  | Blended amount of emulsifier (part by weight) A | 8 | 7.2 | 4 | 15 | 8 | 8 | 8 | 8 | 15 | — | — | — | — |
|  | B | — | — | — | — | — | — | — | — | — | 8 | — | — | — |
|  | C | — | — | — | — | — | — | — | — | — | — | 8 | — | — |
|  | D | — | — | — | — | — | — | — | — | — | — | — | 8 | — |
|  | E | — | — | — | — | — | — | — | — | — | — | — | — | 8 |
|  | F | — | 0.8 | — | — | — | — | — | — | — | — | — | — | — |
|  | Protective colloid | 4 | 4 | 8 | 2 | 4 | 4 | 4 | 4 | — | 4 | 4 | 4 | 4 |
| Evaluations | Mechanical stability (%) | 0.2 | 0.2 | 0.3 | 0.3 | 0.6 | 0.2 | 0.4 | 0.5 | 1.5 | 0.6 | 0.6 | 0.5 | 0.3 |
|  | Moisture-proof adhesive strength (%) | 95 | 96 | 97 | 98 | 95 | 93 | 93 | 93 | 99 | 80 | 80 | 80 | 75 |
|  | Insulating characteristics (%) | 96 | 96 | 97 | 95 | 92 | 93 | 95 | 92 | 80 | 80 | 80 | 80 | 70 |
|  | End peeling (mm) | 0.5 | 0.2 | 0.6 | 0.5 | 0.4 | 0.4 | 0.4 | 0.5 | 0.5 | 0.6 | 0.5 | 0.6 | 0.6 |

In Table 1, the denotations are as follows; A: an ammonium salt of hydrogenated rosin, B: a potassium salt of disproportionated rosin, C: a sodium salt of abietic acid, D: sodium dodecylbenzenesulfonate, E: polyoxyethylene alkyliphenyl ether, F: an ammonium salt of polymerized rosin and protective coluoid:ammonia aqueous solution of casein.

What is claimed is:

1. An aqueous pressure-sensitive adhesive composition: comprising a rubber-based latex and a tackifier resin emulsion, wherein
   the tackifier resin emulsion is that obtained by emulsifying a tackifier resin in the presence of an emulsifier containing an ammonium salt of rosins;
   the aqueous pressure-sensitive adhesive composition contains a water-soluble salt of casein as protective colloid, and
   the ammonium salt of rosins is an ammonium salt of rosins containing dihydroabietic acid by at least 50% by weight or more.

2. The aqueous pressure-sensitive adhesive composition according to claim 1, wherein the rubber-based latex contains a natural rubber latex and a styrene-butadiene copolymer latex.

3. The aqueous pressure-sensitive adhesive composition according to claim 1, wherein the tackifier resin emulsion contains 1 to 20 parts by weight of the ammonium salt of rosins with respect to 100 parts by weight of the tackifier resin in terms of a non-volatile component.

4. The aqueous pressure-sensitive adhesive composition according to claim 1, wherein the tackifier resin contains an aliphatic petroleum resin and an alkylphenol resin.

5. The aqueous pressure-sensitive adhesive composition according to claim 1, wherein the tackifier resin emulsion is that obtained by emulsifying the tackifier resin in the presence of the emulsifier containing the ammonium salt of rosins and the protective colloid containing the water-soluble salt of casein.

6. The aqueous pressure-sensitive adhesive composition according to claim 1, comprising 1 to 10 parts by weight of the water-soluble salt of casein with respect to 100 parts by weight of the tackifier resin in terms of a non-volatile component.

7. The aqueous pressure-sensitive adhesive composition according to claim 1, comprising 40 to 150 parts by weight of the tackifier resin emulsion with respect to 100 parts by weight of the rubber-based latex in terms of a non-volatile component.

8. The aqueous pressure-sensitive adhesive composition according to claim 1, wherein the tackifier resin emulsion further comprises an ammonium salt of polymerized rosins.

9. The aqueous pressure-sensitive adhesive composition according to claim 1, wherein the aqueous pressure-sensitive adhesive has a moisture proof adhesive strength of at least 93% ((adhesive strength after humidifying/initial adhesive strength)×100) and insulating characteristics of at least 92% ((volume resistivity after humidifying/initial volume resistivity)×100).

10. The aqueous pressure-sensitive adhesive composition according to claim 2, wherein a proportion in weight ratio of the natural rubber latex and the styrene-butadiene copolymer latex is the former:the latter=10:90 to 90:10 in terms of a non-volatile component.

11. The aqueous pressure-sensitive adhesive composition according to claim 2, wherein the natural rubber latex is a mixture of an unmodified natural rubber latex and an acrylic modified natural rubber latex.

12. The aqueous pressure-sensitive adhesive composition according to claim 4, wherein the ratio of aliphatic petroleum resin:alkylphenol resin is from 95:5 to 50:50.

13. A pressure-sensitive adhesive tape comprising a pressure-sensitive adhesive layer on at least one side of a substrate, wherein the pressure-sensitive adhesive layer is formed by an aqueous pressure-sensitive adhesive composition according to claim 1.

14. The pressure-sensitive adhesive tape according to claim 13, wherein the substrate is a polyvinyl chloride film.

15. A pressure-sensitive adhesive tape for protecting or binding a wire harness: comprising the pressure-sensitive adhesive tape according to claim 13.

16. A pressure-sensitive adhesive tape for protecting or binding a wire harness: comprising the pressure-sensitive adhesive tape according to claim 14.

17. A protected or bound wire harness, wherein a wire harness is protected or bound by the pressure-sensitive adhesive tape according to claim 16.

18. A protected or bound wire harness, wherein a wire harness is protected or bound by the pressure-sensitive adhesive tape according to claim 15.

19. An aqueous pressure-sensitive adhesive composition comprising:
 a rubber-based latex;
 a tackifier resin emulsion obtained by emulsifying a tackifier resin in the presence of an emulsifier containing an ammonium salt of rosins, wherein the ammonium salt of rosins is an ammonium salt of rosins containing at least 50% by weight dihydroabietic acid; and
 a water-soluble salt of casein as protective colloid.

20. An aqueous pressure-sensitive adhesive composition comprising:
 a rubber-based latex;
 a tackifier resin emulsion comprising an ammonium salt of rosins, wherein the ammonium salt of rosins is an ammonium salt of rosins containing at least 50% by weight dihydroabietic acid; and
 a water-soluble salt of casein as protective colloid.

\* \* \* \* \*

UNITED STATES PATENT AND TRADEMARK OFFICE
CERTIFICATE OF CORRECTION

| | | |
|---|---|---|
| PATENT NO. | : 7,851,531 B2 | Page 1 of 1 |
| APPLICATION NO. | : 11/652340 | |
| DATED | : December 14, 2010 | |
| INVENTOR(S) | : Takahiro Yatagai et al. | |

It is certified that error appears in the above-identified patent and that said Letters Patent is hereby corrected as shown below:

Column 5, line 58; please delete "tail" and insert --tall--, therefor.

Column 6, line 64; please delete "dose" and insert --does--, therefor.

Column 8, line 43; after "polyimide," insert --polyether imide; polyamide; fully aromatic polyamide;--.

Column 9, line 3; please delete "Rubber-Based Latex" and insert --(Rubber -Based Latex)--, therefor.

Column 9, line 59; please delete "Tackifier Resin Emulsion" and insert --(Tackifier Resin Emulsion)--, therefor.

Column 11, line 30; please delete "alkyliphenyl" and insert --alkylphenyl--, therefor.

Column 11, line 32; please delete "coluoid:" and insert --colloid:--, therefor.

Signed and Sealed this
Twenty-third Day of August, 2011

David J. Kappos
*Director of the United States Patent and Trademark Office*